(12) United States Patent
Johansen

(10) Patent No.: US 10,739,220 B2
(45) Date of Patent: Aug. 11, 2020

(54) OPTICAL PRESSURE SENSOR

(71) Applicant: Tunable InfraRed Technologies AS, Oslo (NO)

(72) Inventor: Ib-Rune Johansen, Oslo (NO)

(73) Assignee: Tunable InfraRed Technologies AS, Oslo (NO)

( * ) Notice: Subject to any disclaimer, the term of this patent is extended or adjusted under 35 U.S.C. 154(b) by 222 days.

(21) Appl. No.: 15/773,491

(22) PCT Filed: Nov. 29, 2016

(86) PCT No.: PCT/EP2016/079145
§ 371 (c)(1),
(2) Date: May 3, 2018

(87) PCT Pub. No.: WO2017/089624
PCT Pub. Date: Jun. 1, 2017

(65) Prior Publication Data
US 2018/0321103 A1 Nov. 8, 2018

(30) Foreign Application Priority Data

Nov. 29, 2015 (NO) .................................. 20151618

(51) Int. Cl.
*G01L 11/02* (2006.01)
*G01L 11/04* (2006.01)
(Continued)

(52) U.S. Cl.
CPC ............ *G01L 11/02* (2013.01); *G01L 9/0076* (2013.01); *G01L 11/04* (2013.01); *G01N 21/1702* (2013.01); *G01N 2021/1704* (2013.01)

(58) Field of Classification Search
CPC ......... G01L 9/00; G01L 9/0076; G01L 11/02; G01L 11/04; G01N 21/17; G01N 21/1702; G01N 2021/1704
See application file for complete search history.

(56) References Cited

U.S. PATENT DOCUMENTS

| 2,043,416 A | 6/1936 | Lueg |
| 4,818,882 A | 4/1989 | Nexo et al. |
| (Continued) | | |

FOREIGN PATENT DOCUMENTS

| CH | 689925 A5 | 1/2000 |
| CN | 204807443 U | 11/2015 |
| DE | 4023154 A1 | 1/1992 |

OTHER PUBLICATIONS

Wikipedia, "Air-wedge shearing interferometer." URL: <https://en.wikipedia.org/wiki/Air-wedge_shearing_interferometer>, Retrieved: Aug. 1, 2018.
(Continued)

*Primary Examiner* — Nguyen Q. Ha
(74) *Attorney, Agent, or Firm* — Ross T. Robinson

(57) ABSTRACT

An optical pressure sensor, such as a microphone, is constituted by two membranes, but where the sound does not arrive perpendicular to the membrane, but comes in from the side. The membranes may be parallel as in a Fabry-Perot or slightly skew as in an Air-wedge shearing interferometer. The pressure sensor uses interferometric readout, and consists of two membranes with essentially equal characteristics, where at least one of the membranes is partially transmitting and partially reflective and the other membrane is at least partially reflective, the membranes being separated by a cavity defined by a spacer part, where the distance between the membranes is variable to provide a shift sensitive Fabry-Perot resonator, and where the two membranes have a common back volume being sealed or essentially
(Continued)

sealed in the frequency one wish to measure, and where a pressure increase results in that the distance between the membranes move in opposite directions.

31 Claims, 23 Drawing Sheets

(51) Int. Cl.
*G01N 21/17* (2006.01)
*G01L 9/00* (2006.01)

(56) References Cited

U.S. PATENT DOCUMENTS

| | | | | |
|---|---|---|---|---|
| 5,128,537 | A * | 7/1992 | Halg | G01F 1/38 250/231.19 |
| 5,832,157 | A | 11/1998 | Berthold et al. | |
| 6,344,647 | B1 | 2/2002 | Jourdain et al. | |
| 7,359,067 | B2 | 4/2008 | Carr | |
| 7,738,116 | B2 * | 6/2010 | Kauppinen | G01N 21/1702 356/498 |
| 2004/0130728 | A1 | 7/2004 | Degertekin et al. | |
| 2005/0018541 | A1 | 1/2005 | Johansen et al. | |
| 2005/0105098 | A1 | 5/2005 | Johansen et al. | |
| 2009/0086214 | A1 * | 4/2009 | Chin | G01H 9/004 356/480 |
| 2009/0262358 | A1 * | 10/2009 | Russell | A61M 16/08 356/450 |
| 2010/0007893 | A1 * | 1/2010 | Hall | G01H 9/004 356/480 |
| 2012/0279280 | A1 | 11/2012 | Rezachek et al. | |
| 2016/0138906 | A1 | 5/2016 | Lacolle et al. | |
| 2017/0090064 | A1 * | 3/2017 | Edwards | G01H 9/004 |
| 2018/0224370 | A1 * | 8/2018 | Johansen | G01N 21/1702 |

OTHER PUBLICATIONS

Daman, Marcel, "International Search Report," prepared for PCT/EP2016/079145, dated Feb. 1, 2017, three pages.

WikiBooks, "Acoustics/Filter Design and Implementation," URL: <https://en.wikibooks.org/wiki/Acoustics/Filter_Design_and_Implementation#Band-stop_filter>, Retrieved: May 3, 2018.

* cited by examiner

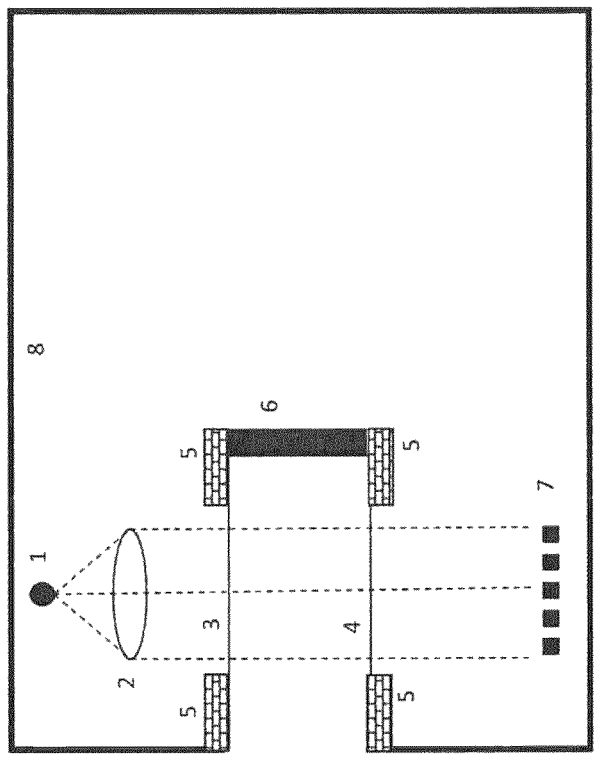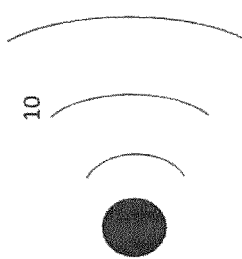
Fig. 1

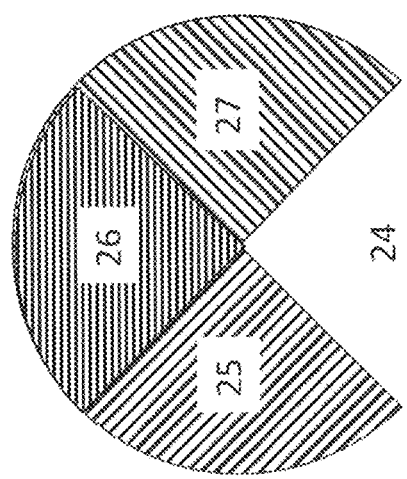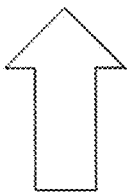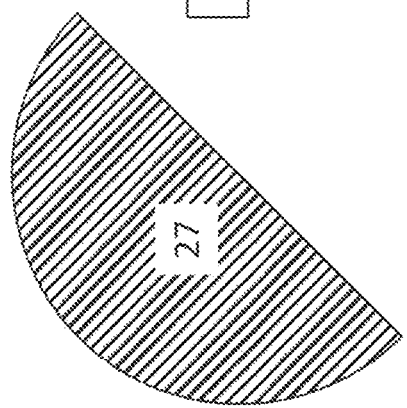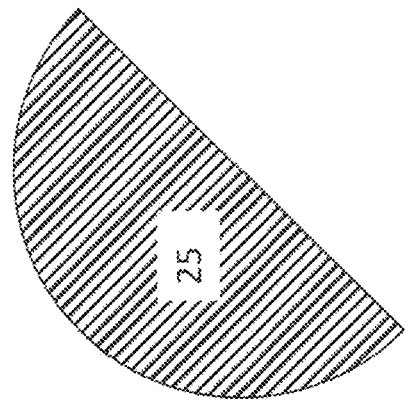
Fig. 11

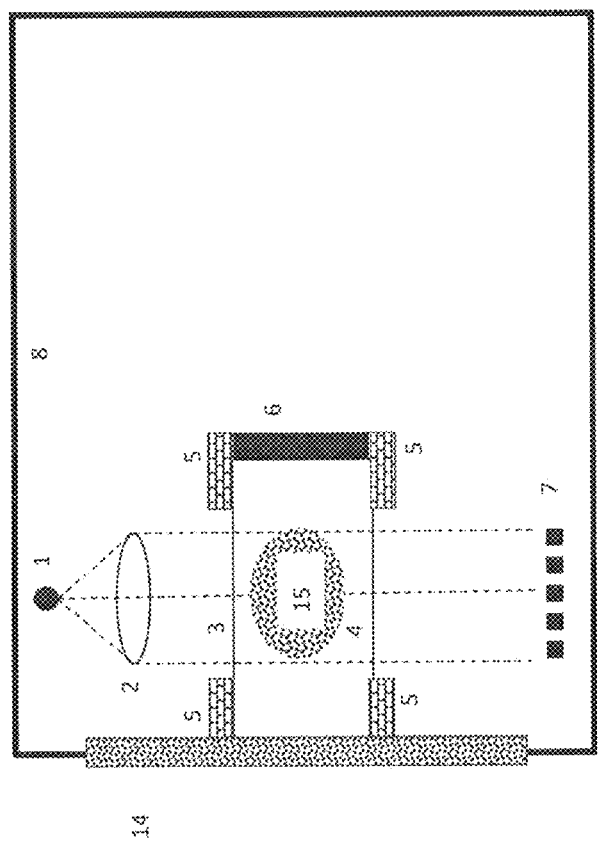
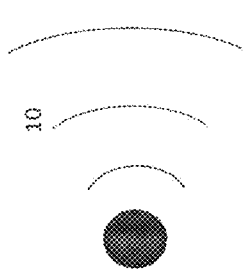
Fig. 17

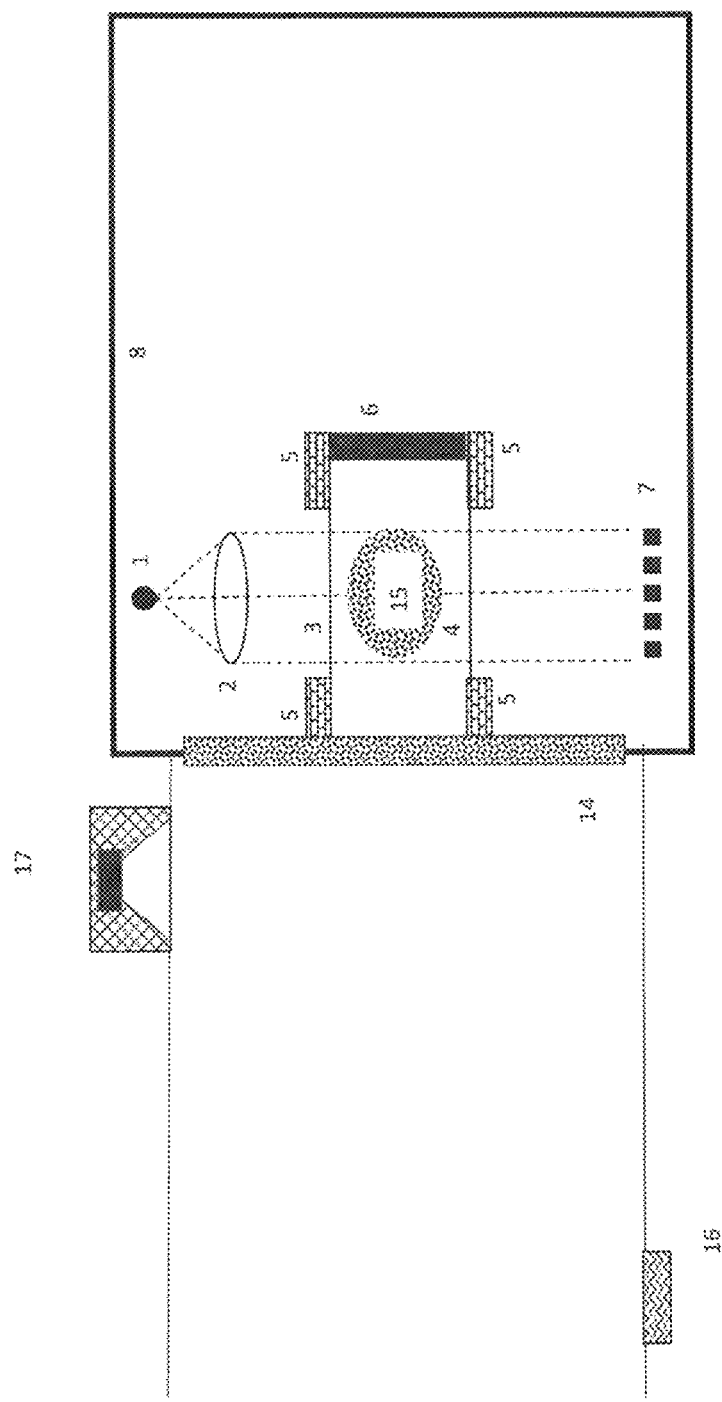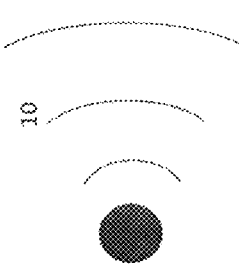
Fig. 18

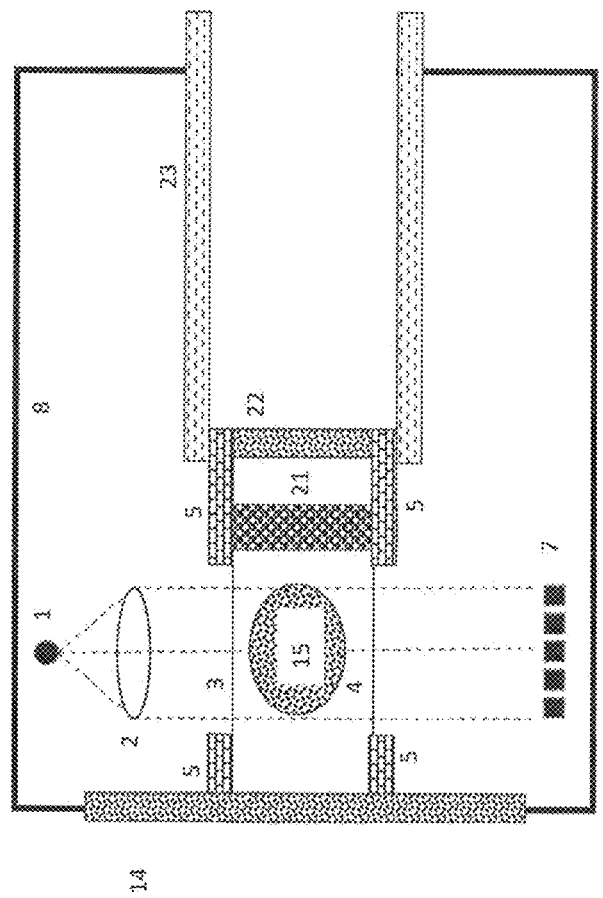
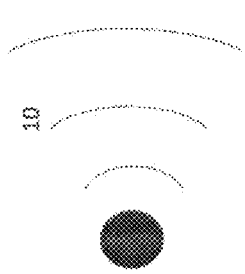
Fig. 21

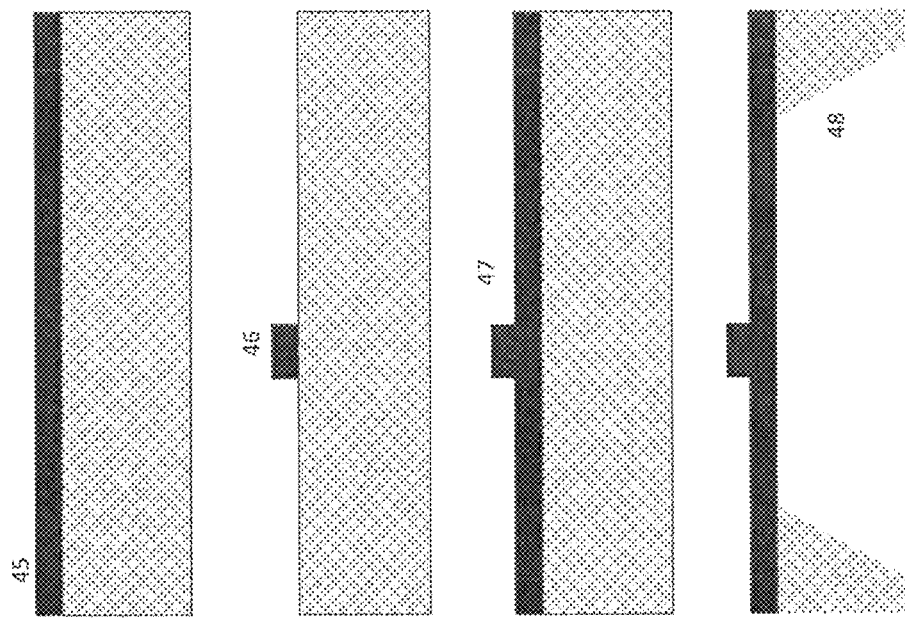

OPTICAL PRESSURE SENSOR

BACKGROUND

Technical Field

The invention relates to an optical pressure sensor using interferometric readout.

History of Related Art

Until recently pressure sensors such as microphones have been based on capacitive structures and impedance measurements. This has a number of disadvantages related to sensitivity, pre-loading at high voltages, positioning of the membrane in relation to a back electrode, noise generated from squeeze-film effects between back electrode and membrane, high quality requirements for preamplifiers and that the membrane has to be sufficiently pre-stressed to avoid the membrane being drawn into the back electrode. These drawbacks contributes to expensive and complicated solutions.

Lately several solutions have been found using optical readout. In US2004/0130728 a modulated grating is used to measure the membrane movements. In US2005/0018541 an improvement is described where a diffractive structure with modulated diffraction efficiency is used, e.g. for measuring pressure. In US2005/0105098 a Fabry-Perot structure is described with an integrated detector in one of the surfaces, and the membrane is constituted by the other surface, and U.S. Pat. Nos. 5,832,157 and 7,359,067 describe how one may use a wavelength controlled laser in relation to a Fabry-Perot sensor, and how the wavelength may be used to provide optimal response. Control of the wavelength usually requires control of the both temperature and current through the diode laser, and often includes extra elements such as Peltier elements, temperature sensors as well as electronic circuitry for control and regulation.

The solutions above have in common the requirement for extremely accurate processing and many process steps for producing the sensor element, or that it requires comprehensive methods for control and regulation. In addition, the sensor principles are vulnerable for external vibration. It is therefore an object of the present invention to provide an improved solution for the problems raised above.

SUMMARY

The present invention relates to a pressure sensor, for example a microphone measuring pressure fluctuations, consisting of two membranes where the sound or pressure waves does not arrive at an angle perpendicular to the membrane, but from the side, as shown in FIG. 1. The membrane may be in a parallel configuration as one of the surfaces as in a Fabry-Perot, or slightly un-parallel as in an air-wedge shearing interferometer. https://en.wikipedia.org/wiki/Air-wedge_shearing_interferometer.

At a pressure change the distance between the membranes change, and the distance variation may be read out optically as is well known from Fabry-Perot and air-wedge shearing interferometry. If the membranes are of the same thickness and size, and the same stress (softness), external vibrations will affect them essentially at the same magnitude in the same direction while the measured sound or pressure waves will move the membranes in opposite directions. If the distance between the membranes are measured such a sensor would therefore be less influenced by external vibrations and noise. This will be an advantage in a number of applications, e.g. when very weak signals are to be detected and in the use in noisy environments. Such a use is photoacoustic detection in relation to gas sensors, where detection of very weak signals is required, but where external vibrations and external noise often is limiting.

In photoacoustic detection pulsed light sources are used to excite a gas medium or similar, where the light is absorbed by the medium and the medium expands generating a sound signal at the frequency of the pulsed light source. In these applications very low frequencies are often used, and the present invention is well suited for providing sensors having high sensitivity at low frequencies. The membranes may be made very soft (low tension) and thus be sensitive to low frequencies. If such soft membranes were used in a capacitive microphone the membrane would have been pulled into the back electrode, and the microphone would not work. As the invention does not include a membrane blocking the entrance, as with many microphones, it is possible to position gas media sample between the membranes. This also makes it possible to provide an adsorption unit in between or close to the membranes so that it is possible to concentrate a gas sample by adsorbing gas over time and later release it into the little volume defined by the membranes. This also makes it possible to measure very low gas concentrations with a relatively simple sensor. By using semi-permeable membranes, such as a sintered filter with pores between 0.1 and 50 micrometers, and where the thickness of the filter is between 0.1 and 3 mm, it is possible to make an acoustic filter letting in the gas while at the same time filtering out the low frequency noise from the environment and also stops the photo acoustic signal from leaking out. This technique is well known, e.g. from U.S. Pat. No. 4,818,882 and CH689925. By combining this known technique with the present invention it is possible to provide a system being very suitable for suppressing noise and vibrations from outside, while at the same time detecting very weak signals from the photoacoustic process. This may, however, be improved by adding active and passive filters removing external noise within the frequency or frequencies used by the photoacoustic sensor.

As an interferometric readout principle is used between two reflective surfaces the distance between the surfaces can be made relatively large, and for practical reasons the distance should be more than 10 micrometers so as to avoid the squeezefilm effects damping the mechanical movements or generating noise. A practical distance between the membranes may be in the range of 10 micrometers to 10 mm.

In a parallel interferometer it is possible to tune working point by tuning the wavelength of the light. The working point will usually be close to the maximum sensitivity or when the response is most linear, or when the highest dynamic range is achieved. The light source is typically a diode laser 1 and the wavelength may be tuned by either changing the temperature and/or current through the diode laser. One can also tune the working point by altering the distance between the membranes, e.g. with a PZT element, electrostatic forces, thermal expansion etc. the working point may also be changed by varying the angle of the collimated light relative to the membranes, e.g. by moving the laser chip relative to a lens, or by changing the angle of the membranes relative to the collimated light.

If the membranes are slightly un-parallel the collimated light through the membranes will provide an interference patter, for example a linear pattern, and one may detect this pattern in a 1D or 2D array. Alternatively, one may obtain the interference pattern by letting the laser light be less than 100% collimated, but letting it diverge or converge weakly, and then detect it with an array of detectors. Or, it is possible to provide small recesses in the membranes, (or flat, parallel recesses), so that several different distances are provided in the interferometer, but where each distance is localized in a certain area so as to allow readout of every distance in the respective detectors. Advantageously it is possible to adapt the distances so as to obtain or essentially obtain a phase shift in the interference signal of 0° and 90°, or 0°, 120° and 240°, or 0°, 60° and 120°, or other combinations providing good sensitivity or dynamics for example as disclosed in US2016/0138906 (Lacolle). In it's simple form one may sample several channels to linearize the signal and/or extend the dynamic range. An alternative to the recesses, it is possible to provide a layer of material in the same position so that the optical path length is changed, and one may obtain the required phase shifts in the interference signals.

BRIEF DESCRIPTION OF THE DRAWINGS

The invention will be described below with reference to the accompanying drawings, illustrating the invention by way of examples.

FIG. 1 illustrates the cross section of the preferred embodiment of the invention.

FIG. 11 illustrates a process for generating three or four heights or distances with only one recess per membrane.

FIG. 17 illustrates the cross section of an embodiment of the invention used as a photoacoustic gas detector FIG. 18 illustrates the cross section of an embodiment of the invention used as a photoacoustic gas sensor including an active noise reduction.

FIG. 21 illustrates the cross section of the invention used as a gas detector, including an adsorption unit.

FIG. 23 illustrates a process for generating a membrane with a controlled height difference.

DETAILED DESCRIPTION

Figure 2:
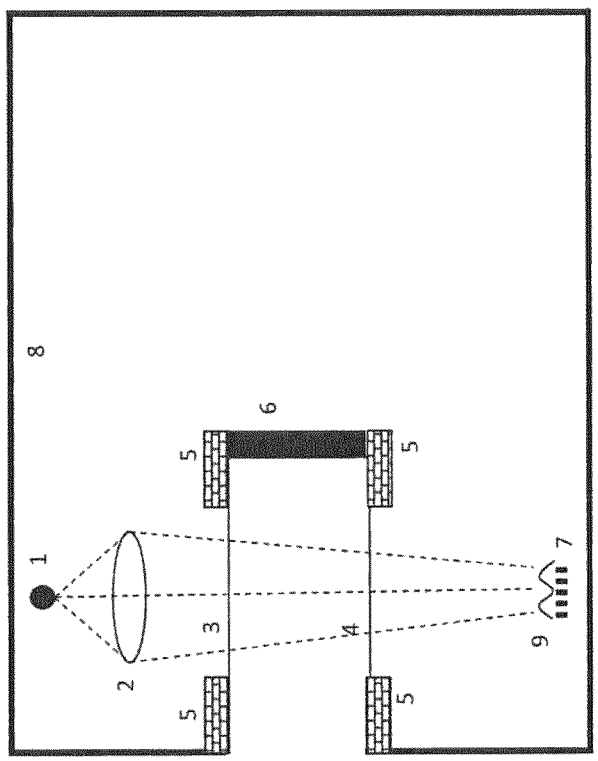
FIG. 2 illustrates the cross section of an embodiment using converging light.

FIG. 1 illustrates the principle of the invention, including an optical pressure sensor, e.g. an optical microphone, comprising two membranes 3, 4, but where the acoustic source 10 is on the side of the membranes. The membranes are mounted on a carrier structure 5, and a separating spacer part 6 separating the membranes with a chosen distance. The membranes 3,4, carrier structure 5, spacer part 6 and housing 8 enclosing the structure together constitute a sealed or almost sealed unit for the acoustic frequencies intended to be measured. The enclose volume thus also represents a common back or reference volume for the two membranes moving as response to the pressure fluctuations in the volume thus acting as a sensor volume. If this is an absolute pressure meter, the unit has to be completely sealed, but for a microphone, a leakage channel is usually used providing pressure equalization. The leakage channel may typically have a time constant between 0.01 and 10 seconds depending on the frequency of the pressure or sound waves to be measured.

The membrane 3,4 material may depend on the application as well as available production, and be chosen from a large range of materials having sufficient stiffness, flexibility and strength, the environmental conditions in the specific use of the system, as well as suitable reflection and transmission characteristics.

As discussed above a pressure rise will make the distance between the membranes change. The membranes 3,4 are typically from a material being partially reflective and partially transmitting, so as to provide an interferometer together. If they are essentially parallel the will constitute a Fabry-Perot interferometer. By emitting light from a light source 1 with a sufficiently long coherence length between the membranes one may measure the change in the relative position between the membranes on a detector or detector array 7 by detecting the variations in the light intensity transmitted through the interferometer using at least one light sensor or by detecting the resulting changes in the interference pattern at the detector side of the interferometer using a one or two dimensional detector array, e.g. as discussed in US2016/0138906. Typically the light source 1 will be a laser or a narrow band LED. If a collimated or nearly collimated light beam is required an optical element 2 may be used between the light source and the membranes. This may typically be a lens, usually refractive or diffractive, or reflective optics. In FIG. 1 the light is transmitted in an angle essentially normal to the membranes. In some cases one will avoid reflections back to the light source 1 and may choose to have a slightly slated propagation direction through the membranes.

The spacer part 6 has a primary object to provide a distance between the carrier structures holding the membranes is essentially fixed, but the spacer part 6 may also be made from a material changing the distance, such as a PZT (piezoelectric transducer), changing the distance as a response to an applied voltage. Such a material changing the distance may be used to control the distance between the membranes and thus optimize the work point for the interferometric readout. The working point may also be optimized by changing the wavelength of the light source 1.

FIG. 2 shows how one may use converging laser light to make an interference pattern 9. The different incident angles give the light different propagation paths, and generates an interference pattern. The interference pattern will depend on how the lens 2 is shaped. The lens may collimate the light in one direction relative to the optical axis while converging slightly in the other, which would require an ordinary lens combined with cylindrical optics. In modern optics it is possible to generate essentially any wanted lens characteristics. The interference pattern may then be read by a 1D or 2D detector array, or a detector with ring segments or ring segment parts.

Figure 3:
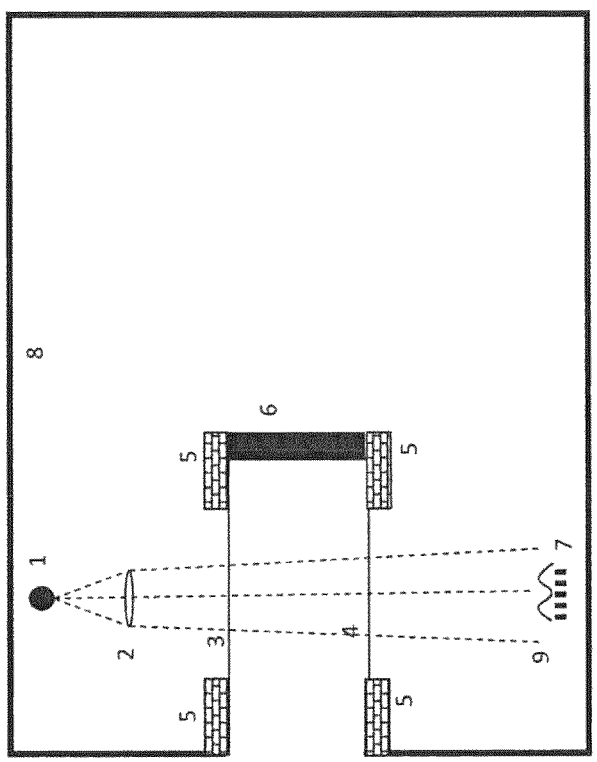
FIG. 3 illustrates the cross section of an embodiment using diverging light.

FIG. 3 shows how one may use diverging laser light to make an interference pattern 9. As stated above, the different angles of the light will obtain different propagation path lengths, and thus generate an interference pattern. The interference pattern will depend on how the lens is shaped. As illustrated in FIG. 3 the lens may collimate the light in one direction and diverge slightly in the other direction, which could require an ordinary lens in combination with cylinder optics such as a cylindrical lens. The lens or lenses may be made using refractive optics or diffractive optics. The interference pattern may be read out using 1D or 2D detector arrays, or a detector with ring segments or partial ring segments.

If one chose to make the pressure sensor according to an embodiment of this invention using methods for micromachining semi-conductors such as silicon, it is easy to provide parallel membranes. It may, however, be more complicated to make a membrane with a controlled angle.

Figure 4:
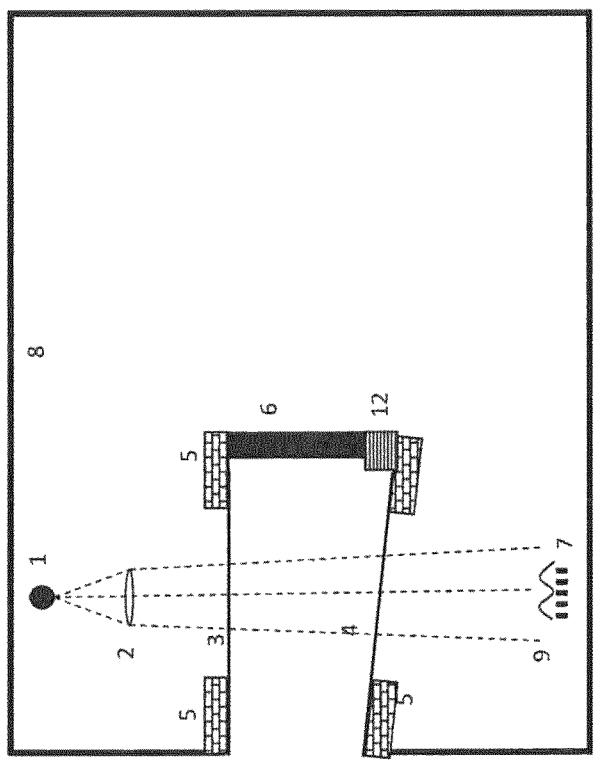
FIG. 4 illustrates the cross section of an embodiment using one tilted membrane.

FIG. 4 illustrates how one may combine membranes that are not parallel using a spacer part 12. The light through the membranes may be collimated, diverging or converging. If the light is collimated and the membrane parallel in one direction and slightly unparallel in the other direction a linear pattern may be detected on a one dimensional 1D array. The spacer part may be adjustable so that the distance is changed by for example applying a certain voltage. That way it is possible to use just one single detector element by adjusting the height so as to obtain a useful operating work point.

Figure 5:
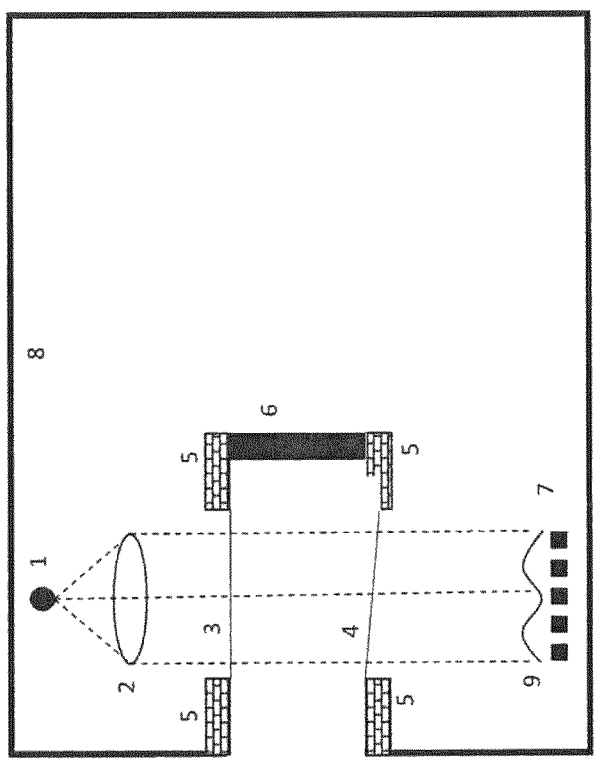
FIG. 5 illustrates the cross section of a second embodiment using one tilted membrane.

Another method for obtaining nonparallel membranes is shown in FIG. 5. The membrane may be micro machined, and made in a way to make the membranes non-parallel, either by micromachining a height difference on one side or in that the membranes are made on a wedged wafer. In both cases one may use a spacer part 6 which is very parallel, and at the same time obtain a controlled angle between the membranes.

Figure 6:
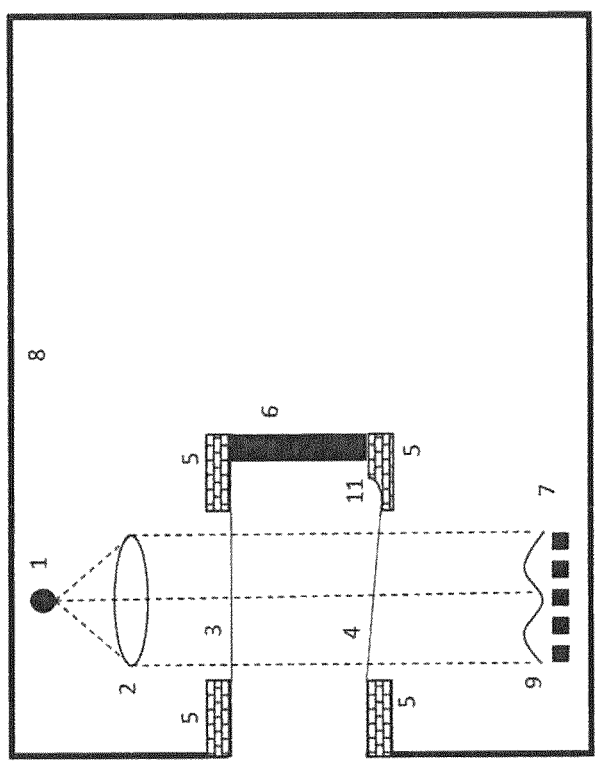
FIG. 6 illustrates the cross section of a third embodiment using one tilted membrane.

FIG. 6 shows another method for obtaining an angle between the membranes. One may unparallel membranes by pulling in one end of the membrane 11, for example using electrostatic force in a per se known way between an electrode on the carrier structure 5 and another electrode 11 close to the edge of the membrane 4. Depending on the material and voltage it is some times possible to put the membrane in a permanent position so as not to apply the voltage permanently. In principle it may be used to tighten a membrane having to little tension, or control the distance so as to obtain an optimal working point.

Figure 7:
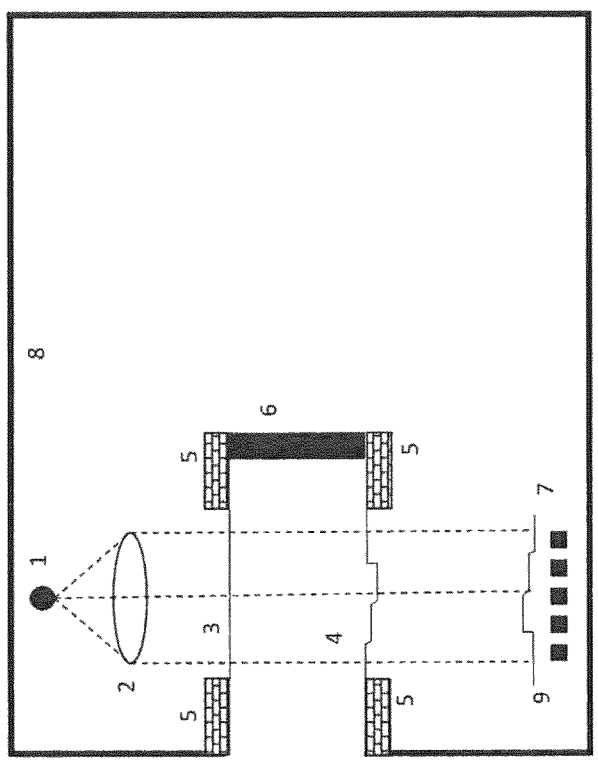
FIG. 7 illustrates the cross section of an embodiment using recesses for different distances in different positions.

FIG. 7 shows how it is possible to provide different optical path lengths in different areas. The interference pattern between two membranes, illuminated using collimated light, will vary with the distance and the pattern will repeat itself for every half wavelength. If the reflection is relatively low, typically less than 50%, the interference pattern changes slowly, so that it is possible to find a distance representing an area with good sensitivity and useable linearity (an optimal or close to optimal work point). If a membrane is made with several different heights it is possible to find an area which may be used as a working point and use it. Or it is possible to find a number of well defined distances, and use this to reconstruct the membrane movement over several periods of wavelengths as discussed in US2016/0138906.

Figure 8:
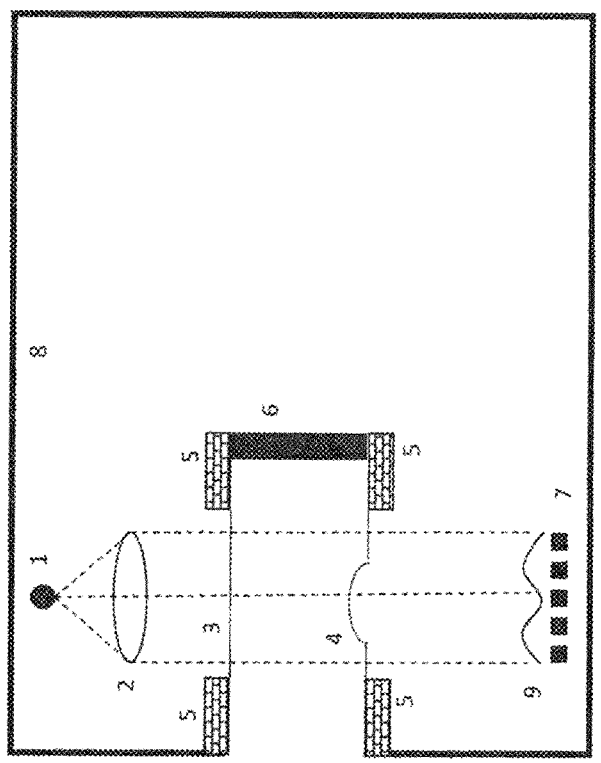
FIG. 8 illustrates the cross section of an embodiment using a bulge on one membrane for generating different distances at different positions.

FIG. 8 illustrates the cross section of an embodiment of the invention using a bulge on the membrane to generate difference membrane distances for different positions. This bulge may for example be slightly spherical in order to generate a ring shaped interference pattern, or the bugle may be triangular or saw tooth shaped. The point is to provide an interference pattern that varies sufficiently to find a useable work point or possibly to measure a relative change in position over several interference periods.

Figure 9:
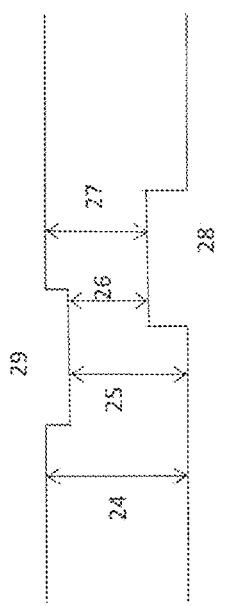
FIG. 9 illustrates the cross section of two membranes in an embodiment using recesses in both membranes for obtaining different distances in different positions.

FIG. 9 illustrates the cross section of the membranes 3,4 in an embodiment of the present invention using recesses for generating different distances between the reflective surfaces of the membranes in different positions along the membrane surfaces. By making a recess 29 in the upper membrane it is possible to generate two different heights 24,25 relative to a flat membrane. If the second membrane also has a recess in the reflective surface, it is possible to generate four different distances 24,25,26,27 between the reflective surfaces of the membranes if the recesses 28,29 on the two membranes have different heights and three different membrane distances if the recesses have the same heights as the distance from recess to non-recess distance 25,27 will then be the same.

Figure 10:
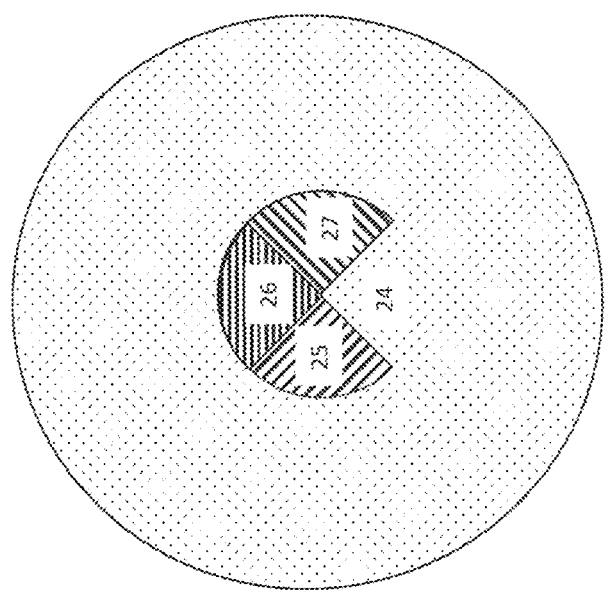
FIG. 10 illustrates a typical location of the recesses in the middle of a membrane.

FIG. 10 illustrates as seen from above how the recesses on the membranes may be positioned in the middle of the membranes so that a collimated laser may be used to illuminate the whole area, where a 2×2 detector can be positioned directly under the membranes without additional optics. The position in the center of the membranes will also provide the largest change in distance during a pressure fluctuation.

FIG. 11 illustrates how one may provide three or four different membrane distances with only one recess per membrane by rotating them relative to each other relative to membrane center and optical axis so as to let them partially overlap. In a production process using silicon wafers suitable for making several membranes used in an embodiment of the present invention it is possible to make half-moon shaped recesses 25,27 being rotated by 45 degrees before mounted together. If two such wafers are used, one with recess 25 and another one with recess 27, flip one and place them on top of each other with the recesses partially overlapping with the same side in (or the same side out), one may provide three different distances between the membranes if the recesses have the same depths, and four distances if the recesses are different, as the distances will be without recess 24, first recess 25, second recess 27 and the sum of the first and second recess 26. Typically one may produce 10×10 such membranes on a silicon disc, and then bond two discs together top side against top side or bottom side against bottom side together.

Each of the recesses 25,27 may be half-moon shaped or rectangular, or be constituted by two smaller recesses adjacent each other within the area defined by for example the above-mentioned recesses 25,27, so that one overlaps the recess on the other membrane and the other does not overlap. The advantage with two small recesses is that the relationship between the side wall and area in the recess will make the smaller recesses more rigid and maintain their shapes better than the larger recess when the membrane is free.

Figure 12:
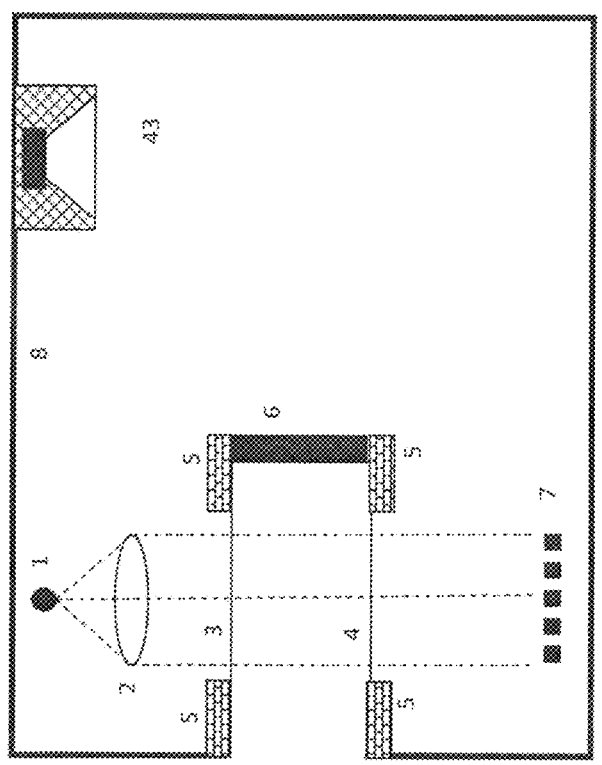
FIG. 12 illustrates the cross section of an embodiment of the invention using an active pressure source in order to change the working point.

In FIG. 12 an alternative embodiment of the invention is shown, providing a useable working point for the sensor. By using a loudspeaker 43 (or any device able to generate a pressure difference inside the back volume), preferably with a tight back volume, one may generate a controlled pressure (limited by the dynamic range of the loudspeaker or pressure generator) inside the microphone back volume so that the distance between the membranes is close to or in the optimal working point. By increasing the pressure in the back volume, the membranes will be pushed together, or by reducing the pressure in the back volume, the membranes will be pulled apart. By using feedback from the interferometric readout, the pressure in the back volume can be adjusted to obtain a usable working point. This may not be suitable for a sensor that has to maintain a constant working point: 1) Because changes in external pressure and temperature can make the dynamic range of the loudspeaker insufficient, or 2) in case the back volume is leaking or equipped with a pressure equalizer. However, the solution may be useful when it is sufficient to maintain the optimal working point for a limited period of time.

Figure 13:
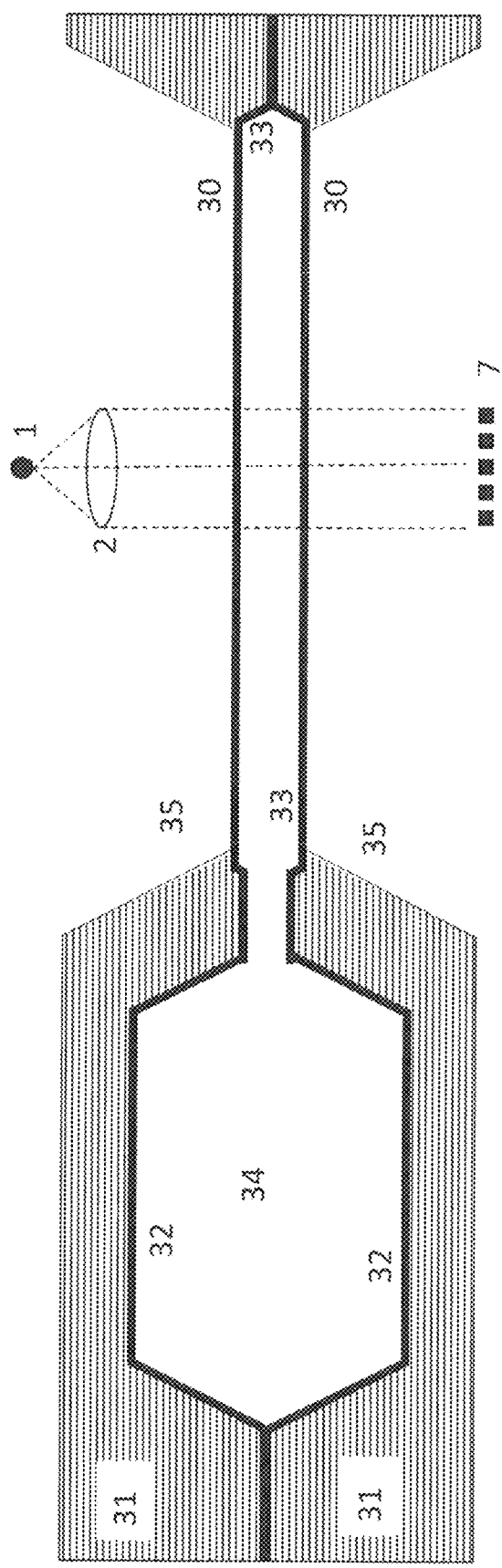
FIG. 13 illustrates the cross section an embodiment processed from a silicon wafer.

A possible production method suitable for example for making both the outside box 34 with its IR transmitting windows 30 with two silicon discs is shown in FIG. 13 where two essentially identical silicon discs are mounted together top to top. In this case wet etching is used to make an, e.g. 400 µm recess 32 in a 600 µm thick silicon wafer 31. On the same side a more shallow recess 33, e.g. 50 µm deep is etched, and this is connected to the first recess 32 by machining a channel between them. One may then provide a material such as silicon nitride on the wafer and in the recesses which through free etching from the other side will constitute one of the membranes. By making two identical discs using the same processing and having similar recesses, and bonding them together with the recesses toward each other, both the measuring box area 34 and the cavity between the two opposing membranes may be produced. In the end a wet etch may be used to free the membranes 35 from the outside. The membrane movements may then be read as described above by transmitting the light beam from the light source 1 and possibly a lens 2 through the membranes 3,4 to the detector or detector array 7.

According to this embodiment a gas sample may be analysed in a photoacoustic application if the gas to be analyzed is diffused or pumped into the measuring box area 34, and the gas is then irradiated with the relevant wavelengths of light (not shown) so as to provide an acoustic signal. The acoustic signal would then be transported via the channel to the membranes providing a movement between the membranes that may be measured. If the gas in the chamber thus absorbs light from a pulsed light beam the amplitude of the membrane movements at the pulsed frequency will provide an indication of the amount of absorbing gas in the chamber.

If the silicon nitride deposited to form the membranes is not actively removed from the outside of the chamber or box 34 it may constitute an anti-reflection layer both inside and outside the silicon.

Silicon nitride has a refractive index of approximately 2, and is therefore at a chosen thickness suitable for use as antireflective coating on silicon having a refractive index of approximately 3.4. The thickness of the antireflective coating may in some cases be essentially the same as the thickness of the nitride membrane 30, in the range of 50 to 200 nm.

In FIG. 13 we have shown how two essentially similar parts 31 may be put together to provide one unit. The parts are each made from a silicon wafer where the recesses 32,33, as well as the channel between them, is etched first. After this the membrane material is deposited constituted by silicon nitride, silicon oxynitride, diamond like carbon materials or other membrane materials. When the membrane material is deposited it is usually preferred to bond the wafers together. One may then use advanced bonding methods using surface actuation and bond the wafers together without removing the membrane material on the surfaces bonded together, or the membrane material is removed and possibly an oxide layer may be used to protect the surface and bond them together using fusion bonding. Alternatively, a third wafer is used between the others. This could be a pyrex disc with through going openings where the membrane 30 and the cavity 34 is, where the pyrex disc is bonded to the two others using anodic bonding.

Figure 14:
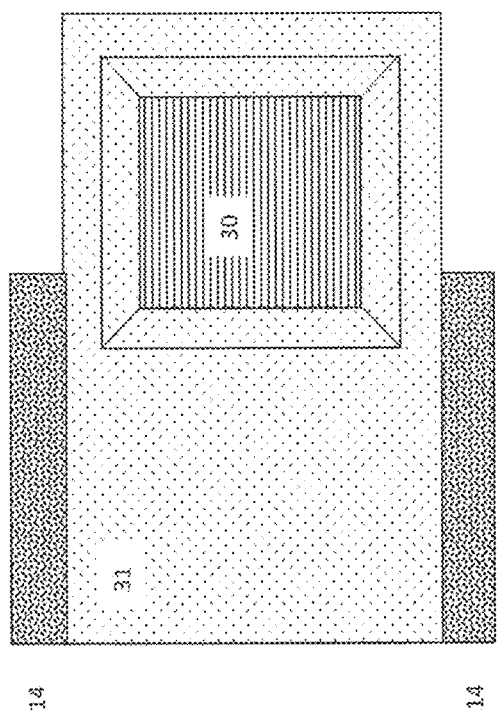
FIG. 14 illustrates the component in FIG. 13 with semipermeable membranes mounted.

FIG. 14 illustrates the component in FIG. 13 with a semi permeable membrane 14 mounted on each side. By placing a semipermeable membrane, such as a sintered filter of metal or aluminum oxide on each side of the measuring area 34 one may provide a measuring area which is acoustically sealed within the frequency the measurement is performed, while e.g. a gas can stream slowly into the measure cavity 34. Such a semipermeable membrane may function as an acoustic low pass filter ensuring that the acoustic signal from the photoacoustic measurement does not leak out. The membrane 14 may be exchanged with other acoustic filters having the same function. The drawing shows such a component for example made from a semiconductive material 31 such as silicon, with a membrane 30 of for example silicon nitride and where the sintered filter is mounted on the sides. Using silicon as a material makes it possible to use the silicon as an IR widow.

If the recess 33 overlap with the area 35 for free-etching of the membrane, one will obtain a total or partial stress relaxation in the membrane. Free-etching the membrane also on the sidewall will make the membrane longer. For use in a microphone the partial stress relaxation is optimal, e.g. reducing stress in the silicon nitride from 1 GPa down to 10-20 MPa.

Figure 15:
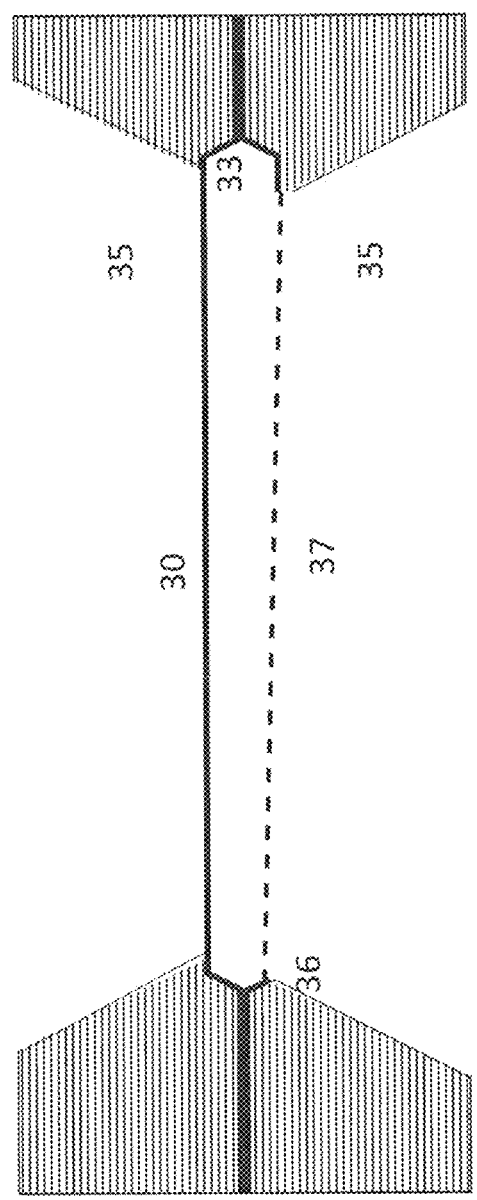
FIG. 15 illustrates a method for providing a slanted membrane on a silicon wafer.

FIG. 15 illustrates one way to reduce the stress in a membrane. By free etching in such a way that the large recess 35 is displaced relative to the membrane one will obtain a lower etching 36 on one side of the membrane. As a membrane often has high strain stress and is stretched like a drum skin the membrane will stretch until nearly straight, as illustrated with the dotted membrane 37 in the drawing. A silicon nitride membrane may have a strain in the range of 1 GPa, and then it is fairly strained and stiff. The movements will then be relatively small at a given sound pressure. If the stress in the membrane is reduced to e.g. 10 MPa the membrane will be much softer (approximately 100 times) and a lot more sensitive to the same sound pressure. A tilted membrane made by the principles above will provide two advantages; reduced stress and increased sensitivity, and the two membranes will together provide a tilted interferometer which will give a linear pattern when illuminated by a collimated laser. By positioning a detector array in the linear pattern one may detect the areas being most sensitive to distance changes between the membranes, and also one may reconstruct the acoustic signal over several periods, if the array is sufficiently long to cover at least one period of the interference pattern.

One method for reducing the stress in the membrane by free etching the end edge 36 may of course be made essentially symmetric by free etching the edge on both sides the same amount, or on all four sides. One may then combine this membrane with one of the other methods for reading out the movements of the membrane. One may also choose if the side edges should be free etched or not. If the edges are free etched the membrane will be more soft (lower stress).

If the recess 35 is wider than the recess 33 when the membrane is release etched, the membrane 30 will become longer, since the membrane length will be the sum of the length of the bottom and the side walls of the recess 33. An increase in membrane length will give, a reduction in the final stress of the membrane. By adjusting the depth of the recess 33, the stress in the membrane 30 or 37 can be controlled, and adjusted to the wanted value. If only three sides of the recess 33 is free etched, the membrane will be stretched up between the side that is not free etched, and the opposite side, and we will get a tilted membrane.

To calculate the stress reduction, Hooke's law can be used as a first order approximation.

$$\sigma = E\varepsilon, \varepsilon = \Delta L/L$$

If the membrane stress is 1 GPa ($\sigma$) and Youngs modul (E) is 280 GPa, a 5 mm membrane will be relaxed if the anchor points of the membrane are moved around 9 µm in towards the centrum of the membrane.

$$\Delta L = \varepsilon L = L\sigma/E = 5 \text{ mm} * 1 \text{ GPa}/280 \text{ GPa} = 18 \text{ µm}$$

If we include the Poisson coefficient $\sigma$ (0.27), relaxation is obtained after around 7 µm.

$$\sigma = E/(1-v)\varepsilon$$

A two-dimensional membrane is more complex, and typically, there are small changes in the different parameters depending on processes and manufacturing, so the final relaxation is often obtained by experimental verification.

Figure 16:
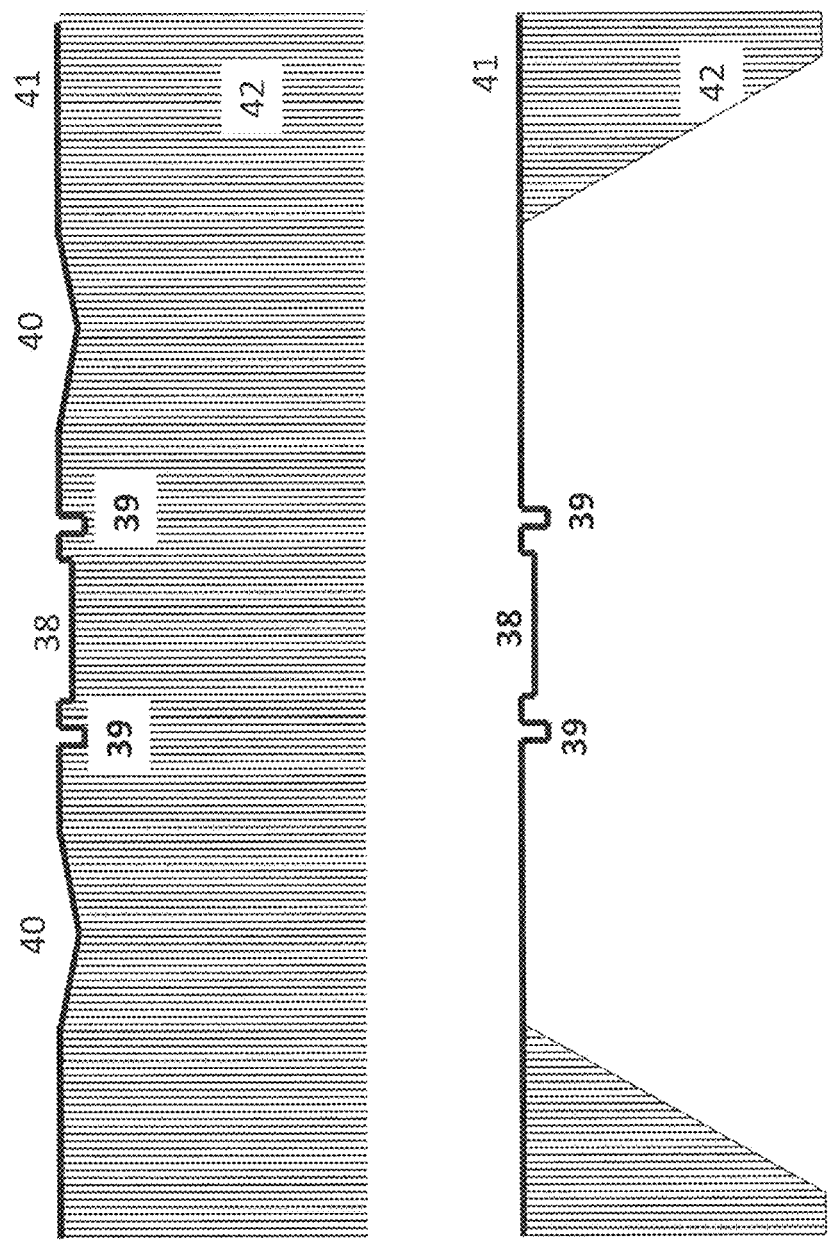
FIG. 16 illustrates a possible production method for a tension relaxed membrane, including recesses.

FIG. 16 illustrates a possible production method for a completely or partially stress relaxed membrane including recesses, e.g. made from silicon nitride. On way to provide a completely or partially stress relaxed membrane is to etch pits 40 without sharp edges or angles in for example a silicon disc. These pits may be shaped triangular or rounded depending on the etching type. One may also deposit silicon nitride in a given thickness, e.g. 100 nm, and then to free etch the membrane in order to remove the silicon wafer in that area. Since standard silicon nitride has high stress, pits without sharp angles will typically be stretched out and the membrane will be relatively flat as illustrated in the lower part of FIG. 16. By choosing the dimension and shape, and possibly use several adjacent pits one may obtain the required stress or flexibility of the membrane. In some occasions a recess with a certain height is wanted, and we want to avoid that the recess is stretched until it is flat. By etching a recess 38 with relatively sharp angles (i.e. close to 90 degrees) the deposited membrane will typically be thicker in the corners and the membrane in the corners will function as a folded plate, which is typically more rigid than an ordinary plate. One may also strengthen this by adding an additional recess 39 outside the first 38. This new recess may be more narrow and deeper than the first. The depth contributes to the rigidity and if it is sufficiently narrow it may be filled with a material. One possibility is to fill it with polysilicon, and then etch the polysilicon from the top until it only remains in the additional recess 39, and thereby stiffens it.

The main point with this stiffening is to maintain the area with the recess 38 relatively flat, to make it useable for optical readout. Further, one may make several recesses adjacent to each other and with different depths, so as to provide sufficient information to reconstruct the signal over several periods and with a good signal to noise ratio. If a second measurement path is used with a height difference giving a phase shift of ±90 degrees (and the two signals are combined), it is possible to reconstruct the signal as discussed above. Even better results are usually obtained with three signals having a phase change of 0, ±60 and ±120 degrees, as one will avoid division by zero and will not get problems finding out if the signal is on top of a sine curve. It is also possible to use more than three differences in height or distance. Also, one may make the recesses so that they have a pattern as a detector array with 2×2 detectors or 1×3 detectors, but it is also possible to place the detectors one by one on a circuit board, and then use three individual detectors positioned in relationship to each recess or height/distance differences.

The sensor described above have a number of different applications, and especially within the field of photoacoustic detection with high sensitivity and robustness in relation to vibrations and external noise. FIG. 17 shows a possible assembly of a photoacoustic detector including a gas volume between the membranes 3,4 to be excited by a light beam 15 within a chosen range of wavelengths, the light beam being pulsed or varied at a chosen rate so as to generate an acoustic signal from the gas sample to be detected as relative movements between the membranes.

A sintered filter, flame arrestor or semi transmitting/semi permeable membrane 14 is provided to let the gas into the microphone part, and in the illustrated example a light beam 15 exiting the gas inside the volume generating a photoacoustic signal measured by the optical detection system. In this arrangement the contribution from the external sound source 10 is not wanted and the semi permeable filter 14 may function as a low pass filter letting the gas in, reducing the external noise in the frequencies at which the excitation light 15 is modulated and possible over harmonic's. At the detection frequency the semipermeable filter will function as a low pass filter not releasing the pressure increase generated by the photoacoustic process.

It is preferred to use as thin membranes as possible, as the mass of the membranes will be low as well as the influence by vibrations. It is also advantageous use as thin membranes as possible, since the gas moving the membranes will transfer energy to the membrane which will transfer the energy back to the gas as heat and increased pressure. These membranes have low heat conductivity and will therefore contribute more to the pressure increase.

The light beam 15 may be of any type of electromagnetic radiation that can be absorbed by a medium or gas. Typically UV, visible or IR light is used, but radiation within the millimeter wavelength range and typical radar waves are also absorbed by gases. The light beams will typically be filtered by an electronically controlled filter, an interferometric filter such as a Fabry-Perot or a Michelson interferometer, or a controlled laser. Usually the light beam will be modulated, either pulsed or wavelength modulated.

FIG. 18 illustrates how additional noise reduction may be obtained using active noise reduction with anti-sound in order to reduce the sounds from the environment 10, using an external microphone 16 and a loud speaker element 17. As it in the present invention primarily is only required to reduce noise on one single frequency, or within a narrow frequency band, the task is much more simple than active cancellation in head phones, mobile phones etc. The detected signal at the microphone 16 may be scaled relative to the measured reduction through the semi-permeable filter, and then subtracted from the measured photoacoustic signal. The principle is discussed in US2012/0279280.

It is also possible to measure the strength of the external noise out by the microphone on the frequency used by the photoacoustic measurement, and as it is known how much the sound is attenuated through the semipermeable filter it is possible to calculate if the external noise will reduce the signal/noise ratio (SNR). If the noise amplitude will reduce the SNR, it is possible to choose not to let that part of the signal contribute to the calculation of the gas concentration. In principle this may be performed for each pulse from the optical source generating the light beam 15 and thus the photoacoustic signal. An algorithm may then be made to integrate the amplitude for each pulse and delete the individual pulses that will have a negative noise contribution, and then use the mean of the other measurements to improve the SNR.

Figure 19:
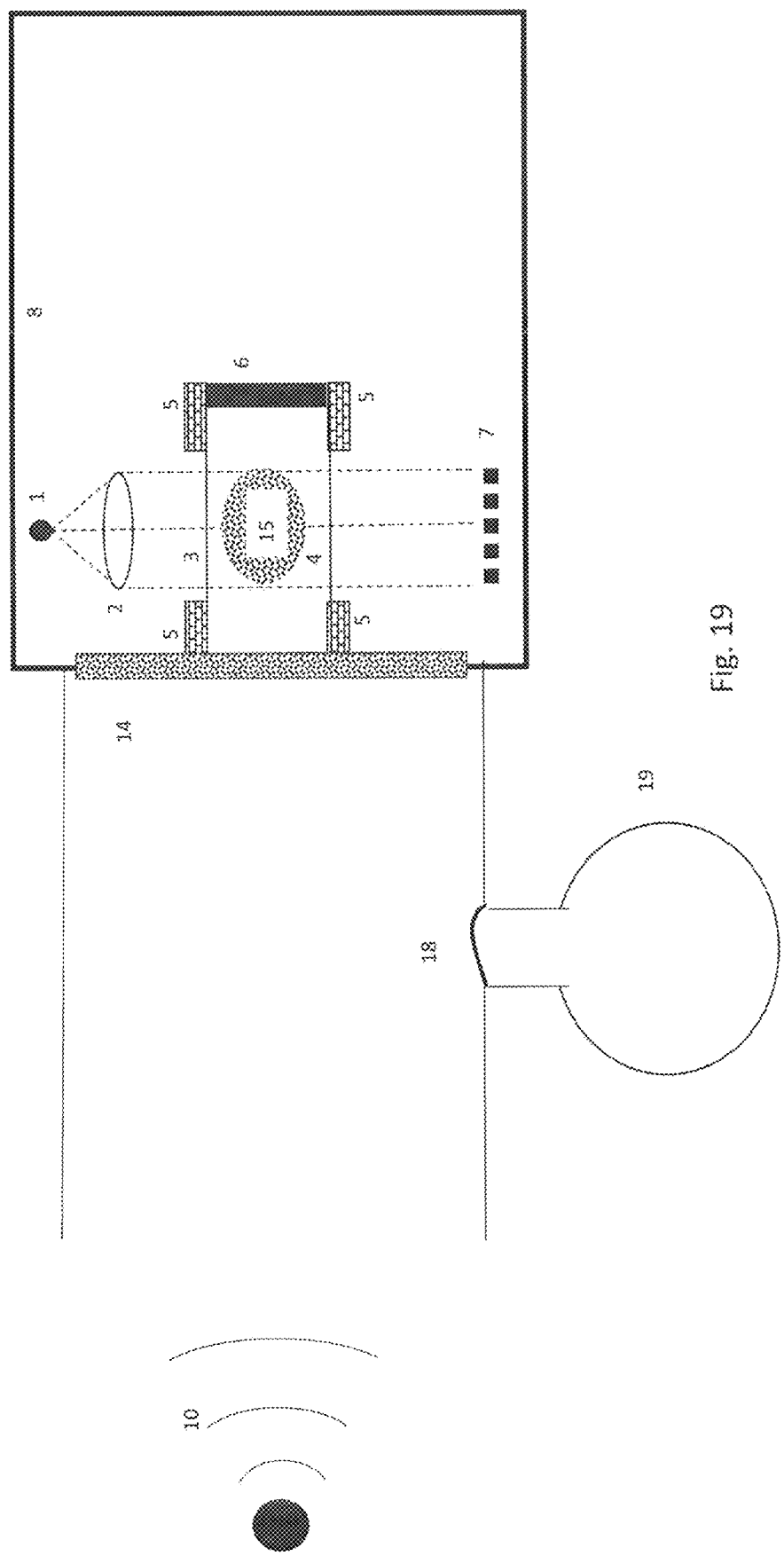
FIG. 19 illustrates the cross section of an embodiment used as a photoacoustic gas detector, including a passive filter for suppressing noise.

Active noise cancellation was invented in 1933, U.S. Pat. No. 2,043,416, and may be found in numerous modifications and improvements from the original design. In a design as illustrated in FIG. 18 a semipermeable membrane 14 in form of a sintered filter with 1 to 20 µm pores and a thickness of 0.1-6 mm, typically have a time constant in the range of seconds, and will thus function as an acoustic low pass filter and may dampen the external noise in the range of 40 dB with a modulation frequency of 100 Hz on the light source 15 exiting the gas. A microphone 16 outside the acoustic low pass filter may be used to measure the noise from the environment and use the loudspeaker to provide an acoustic counter field. In the simplest form the amplitude of the noise is measured and sent back through the loudspeaker with opposite phase, and scale the amplitude sufficiently to remove the noise. It may be advantageous to limit the band width around the actual detection frequency, while making sure that the phase of the signal is not changed significantly. At a frequency of 100 Hz the acoustic wavelength is about 3.3 m, and if the phase error is to be less than 1% the relative distance between the loudspeaker and microphone has to be less than 1% of the wavelength, i.e. 0.033 m=3.3 cm. Also, it is advantageous to position the loudspeaker 17 as close to the acoustic low pass filter as possible, and the microphone 16 as far away as possible but primality with a phase shift less than 1% for the actual acoustic detection wavelength of the photoacoustic signal. If the acoustic wave propagates through free space the sound intensity is reduced by the square of the distance. Therefor it is possible to generate a sound field close to zero at the semipermeable membrane 14 while at the same time the sound field at the microphone is sufficiently different to generate a difference signal. Modern noise cancellation techniques are usually able to reduce the noise by 20-40 dB The use of a notch filter as illustrated in FIG. 19 is well known from the literature. An acoustic notch filter, often called a band stop filter, is described at https://en.wikibooks.org/wiki/Acoustics/Filter_Design_and_Implementation.

The stop frequency is given by the dimensions of the Helmholtz resonator with volume V, connected to the original pipe with area S, via an neck with area Sn and effective length L. The volume V of a notch filter 19 is relatively large for low frequencies, and if used in a gas detector, the gas volume in the notch filter will affect the time response of the gas detector. If a gas concentration is provided the gas volume in the notch filter will dilute the added gas concentration, and thus the gas volume within the acoustic notch filter also has to be exchanged before the sensor may measure the correct gas concentration. The problem may be solved by using a thin membrane 18. The thin membrane 18 hinders the gas to be diluted into the volume of the notch filter so that the time response of the gas detector is not reduced, while the membrane has to be sufficiently flexible not to affect the notch filter function. In relation to the membrane 18 a leakage channel may also be used contributing to a pressure equalization between the front and back side of the flexible membrane, so that the membrane is not strained by pressure differences. Also, if used at low temperatures it is also advantageous if the membrane is heated so that ice, dew, etc does not affect the membrane function.

Figure 20:
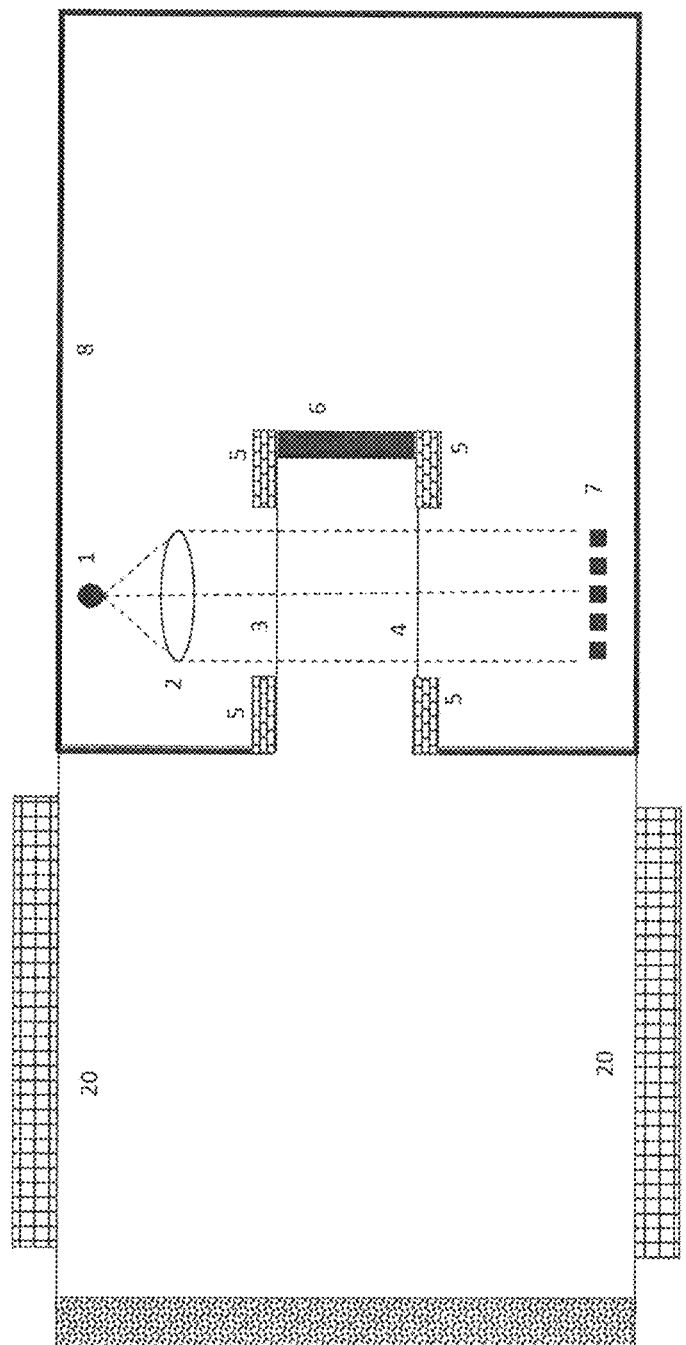
FIG. 20 illustrates the cross section of an embodiment of the invention used as a photoacoustic gas detector, but where the gas is excited in a room connected with the membranes.

It is also possible to use a box outside the unit where the semi-permeable filter 14 let the gas into the box, and where the box has two or four windows 20 so that it is, for example, possible to use four independent light sources, above, under, in and out of the plane of the drawing is illustrated in FIG. 20. The advantage with this solution is that it is easier to use light sources with size from 1 mm and up. The box is coupled to the membranes so that a photoacoustic signal may be generated in the box and transferred to the membranes 3,4.

Figure 22:
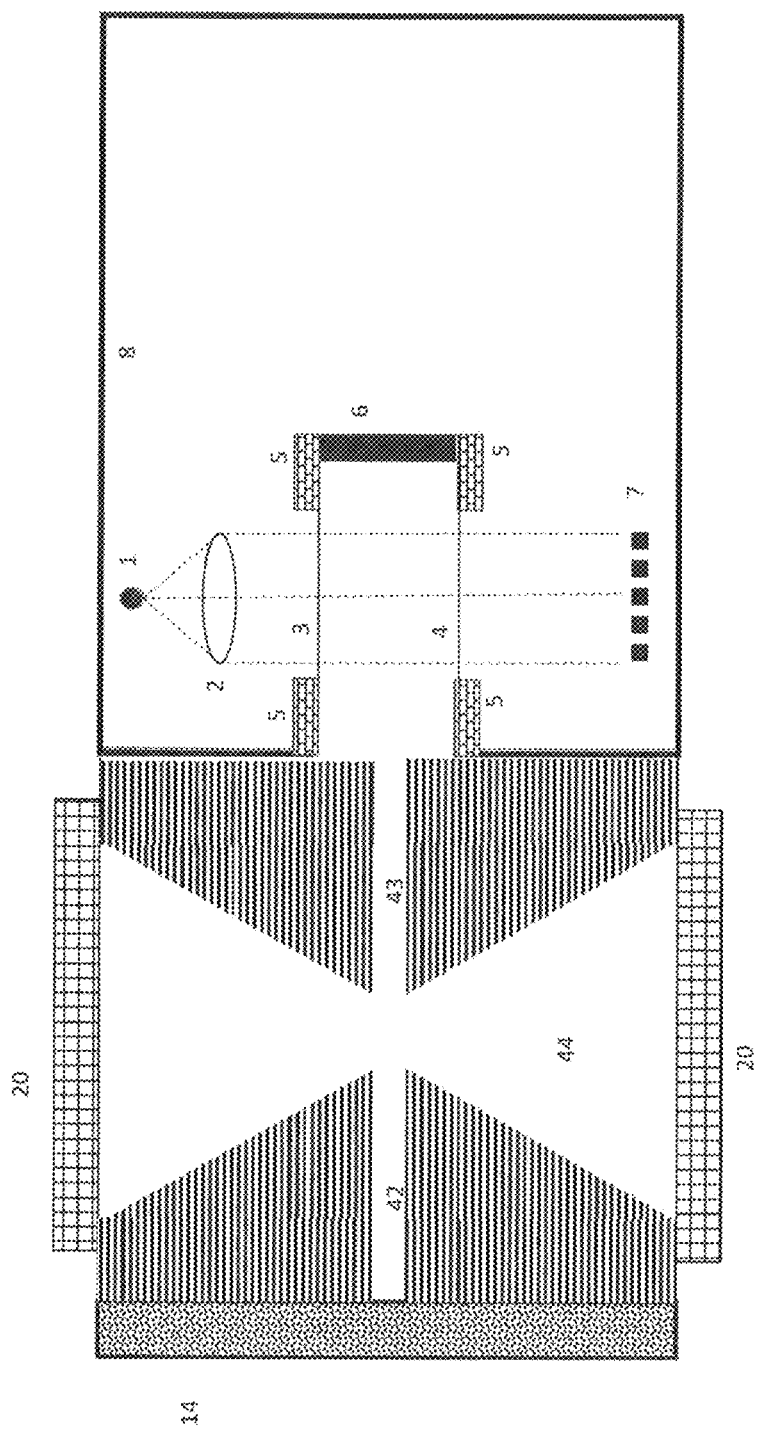
FIG. 22 illustrates another cross section of an embodiment of the invention used as a photoacoustic gas detector, but where the gas is excited in a room connected with the membranes.

When an external light source is used, we may like to reduce the gas volume that needs to be heated. This may be done by shaping the inside of the gas cell. Typically, if a source is focused into the gas cell, the optimal shape will follow the shape of the beam, and we may get a form as illustrated in FIG. 22. By using conical form instead of a cylindrical form, the gas volume 44 is reduced to ⅓, and the photo acoustic signal amplitude will typically be increased by a factor of 3. A channel 42 connects the gas volume 44 to the semi-permeable filter 14, and another channel 43 connects the gas volume 44 to the detection membranes 3 and 4. The back volume of the membranes might have a leakage channel for pressure equalization, or a channel (not illustrated) may go directly from the semi-permeable filter 14 to the back volume. By designing the length and cross-section of the different channels, it is possible to obtain equal contribution from external noise to both sides of the membranes 3 and 4, and thereby reduce the influence from external noise to the photo acoustic signal. The gas cell illustrated in FIG. 22 may be used in a similar way as the gas cell in FIG. 20, with 4 windows and with 4 sources. Or with 2 sources and 2 monitor detectors, the monitor detectors placed at the opposite side of the gas cell relative to the source, as to monitor the amount of light transmitted through the gas cell. The signal detected at the monitor detector can be used to verify the functionality of the source, or to improve the accuracy of the detected gas concentration by compensating for changes in the source.

By including an adsorption unit 21 close to the photoacoustic measuring volume as shown in FIG. 21, and then use a filter 22 to stop the gas from diffusing out of the measured volume, it is possible to increase the gas concentration. The measured volume is connected to a suction unit or pump via a tube 23. The adsorption unit will typically be adapted to the gas to be measured. The gas will be drawn through the adsorption unit and is deposited in it. The gas may then be freed by fast heating of the adsorption unit, and thus the gas concentration may be measured before it has time to diffuse through the semipermeable membranes 14 and 22.

In a microphone or a pressure sensor there has to be a volume behind the membrane to allow it to move as a response to a pressure variation. Especially for microphones this is important, as the gas volume on the back of the membrane (back volume) will be compressed to a degree that it will make a response force limiting the microphone sensitivity. The back volume therefore has to be sufficiently large not to limit the membrane movements. In the present case two membranes opposed are used being mounted in parallel or nearly parallel. For a pressure increase to result in a change in distance between the membranes, the membrane needs a back volume that does not allow the pressure increase in the back volume to provide a counter force equal to the force from the front. The back volume thus has to be constituted either by a sealed or nearly sealed enclosure, and the enclosure has to be either sealed or nearly sealed in the frequencies at which the measurements are to be performed.

In the present invention two membranes are used having a common back volume. This provides several advantages. One advantage being that it is easier to produce a unit with one back volume than producing two back volumes, as the total number of components in the assembly is less. A microphone typically uses a leakage channel from the environment into the back volume. This leakage channel is used to balance the pressure equalization between the environment and the back volume, and without this changes in the static pressure within the back volume would cause the membrane to be pushed out of the area where it is most sensitive. The leakage channel thus lets gas, e.g. air, in only at low frequencies so that the frequency response is not affected. With a common back volume only one leakage channel is needed. Another advantage is that the sound source, detector and membranes may be assembled, and may be mounted in a common enclosure also constituting the back volume.

Within gas chromatography (GC) and mass spectrometry (MS) it is useful to upconcentrate the gas. This may be done by sending the gas through an adsorbent or sorbent, so that the sorbent receives the gas of interest, corresponding to a sponge. When the gas has been adsorbed over a given time, or a given volume of gas has been pushed through, the volume containing the sorbent is closed and the gas let free. This may for example be done by applying heat releasing the gas, or reducing the pressure so that the gas evaporates. One may for example apply chemicals, gases, light, ultrasound or electromagnetic radiation to free the adsorbed gas, and in some cases one wants to change the gas, and may then combine the sorbent with a catalyst. The catalyst may be an independent component or be provided on the sorbent. Such sorbents and sampling systems are commercially available from suppliers of GC and MS (Gas Chromatograph and Mass Spectrometer) systems. Such sorbents may be made from porous silicon(di)oxide or alumina, or possibly other ceramics or zeolites with large surfaces.

Typical for sorbents used for gas detection is that they adsorb large molecules, while small molecules like $O_2$ and $N_2$ is let through.

An object of the gas detection embodiments of the present invention as illustrated in FIGS. 17-21 is to duplicate the nose of a dog. Inside the nose of a dog there are a number of sensitive sensors, receptors. These are used to detect the gas, and to recognize the gas type. What makes the dog nose sensitive is the advanced sampling system. A large amount of gas is drawn into the nose and the molecules fasten to the humid slim film/mucosal in the nose. In addition, the geometry inside the dog nose make it very likely that the smell molecule is fastened to the mucosal at the receptors. When a dog sniffs, with other words draws air into the analyzer, it then holds the air still and analyses. This is what the embodiment of the present invention duplicates.

It is not practical to make a system including a humid mucosal receiving the gas. What may be done is to provide a surface with a sorbent, and up concentrate the gas on this, and then release it. The most efficient way would be to pump the gas through the sorbent, and to free it again fast. This may be performed making a membrane with holes or a fine masked net, and where the membrane or net is heated quickly by applying an electrical current through it. The membrane may be provided with a sorbent making active help of a catalyst or other chemicals or biological substances that may increase the capturing of the relevant molecules.

In some cases, it is advantageous to use a certain temperature on the sorbent and catalyst to increase the capture, and then to increase it to release the gas or convert it to another gas being more easy to detect. This may for example be done to detect explosives containing nitrogen, where the molecules of the explosives are adsorbed by a sorbent provided with a catalyst, and where the sorbent is quickly heated and converts the explosive molecules to many $N_2O$ molecules.

One way to make such a membrane is to micro machine a thin membrane in silicon, for example having a thickness between 4 and 20 µm, and dope this membrane so as to get a resistance useful for fast heating with available voltages, and then to provide a number of holes or openings in the membrane, e.g. by dry etching (DRIE). The holes should typically have a diameter of 2 to 20 µm. Then a sorbent is applied to the perforated membrane, e.g. by dip coating with a solution containing porous, powder shaped alumina, or applying aluminum oxide using sputtering or PLD (Pulsed Lased deposition). In the end the membrane may be provided with its own catalyst, for example by dipping it into a solution containing the catalyst.

Alternatively a net may be used as the resistive material. This may for example be a net of a FeCrAl alloy, NiCr alloy or other resistive material able to withstand exposure to air. The net may be prewoven with contacts on each side, and where a current is sent through the net, or it may be made from a flattened coil. The point being that the net is partially transmissive for the air sucked or pushed through so that the gas to be analyzed is adsorbed on the surface of the sorbent and catalyst.

One possibility to make an artificial mucosal is to mount the sorbent on a thin cooling element, and then to reduce the temperature down to the dew point so that a thin layer of water lay on the surface, and then sample gas over a long period of time, and after that heat the sorbent and water film to release the gas.

In the following we will call the unit made for capturing and releasing the gas an adsorbent unit. Such a unit may be made from a membrane, net, resistive wire, cooling or heating elements, sorbents, catalysts, chemical etc.

By positioning an adsorbent unit inside a photoacoustic sensor according to the invention, the volume the gas will be released into can be made very small, and the gas will become more concentrated. By positioning an adsorbent unit inside a photoacoustic sensor according to the invention, where the gas-tight wall 6 in the drawings discussed above is, and on the outside of this position a new sintered filter, it is possible to make a volume from which the gas only may diffuse slowly. Alternatively the one may, after the adsorption unit, use a channel being so long and thin that the gas has to diffuse slowly though it (relative to the frequencies used in the measuring system). A gas channel with e.g. 1 mm diameter and 50 mm length will have a time response of gas concentration reduction in the range of several seconds. The gas channel or semi-permeable filter may be dimensioned so that the gas escapes sufficiently slowly so that it is possible to measure it, while at the same time tight enough not to allow the photoacoustic signal to leak out or be significantly reduced.

In one embodiment it is also possible to use two acoustic detectors and two adsorption units, and alternatively draw the gas into one sensor and adsorb the gas while the other simultaneously switches off the gas flow though the other sensor. Then it is possible to switch so that the other sensor adsorbs gas while the first analyses. Typically, such a cycle will take from 2 to 60 seconds, but the cycle time may be performed faster or slower. Such an embodiment will for example be suitable for detection of explosives or narcotics, where the cycle time of 5 s would be practical. Such a sensor would thus measure continuously, but will up concentrate the gas 170 times if the volume in the measuring cell is 0.5 ml and the gas us sucked though at a rate of 1.01 per minute.

FIG. 23 illustrates a process for generating a membrane with a controlled height difference. A membrane material 45, i.e. silicon nitride is deposited on a silicon wafer. The membrane material is removed except on the position where we want a height difference, leaving a small region of membrane material 46. We then deposit a new layer of membrane material 47, i.e. silicon nitride. We will then add the new membrane material on top of previous membrane material 46, giving a membrane with a height difference in a given position. Finally, we free etch the membrane from the other side 48, releasing the membrane, and now with a height difference on the selected region. By putting two such membranes together, in a similar manner as illustrated in FIGS. 9, 10 and 11, we can make two, three or four different height distances. The region of membrane material 46 may of course be implemented on the other side of the membrane as well. This will typically involve more processing steps, as it will be necessary to etch a small recess in the silicon first, deposit silicon nitride, remove the silicon nitride outside the recess, deposit a new layer of silicon nitride, and the release etch the membrane.

For the optical readout of the membrane movements a laser or diode laser would typically be used as a source. If the distance between the membranes is sufficiently short a LED or similar source with sufficiently long coherence length could be used. In some cases, it is not necessary to use a lens, while other times it may be advantageous to collimate the light from the source. The diode lasers in the NIR and visible ranges are at the present the cheapest, and detectors of silicon may be used if the membranes are made from materials transmitting between 200 nm and 1200 nm. Light sources and detectors may be chosen or adjusted according to the transmissive characteristics of the preferred membrane material.

To summarize the invention relates to an optical pressure sensor using interferometric readout of pressure variations, such as sound, thus functioning as a microphone within a chosen frequency range, or pressure waves generated in photoacoustic gas detection. The sensor comprises two membranes with essentially similar mechanical characteristics, where at least one of the membrane are partially transmitting and partially reflective, and where the second membrane is at least partially reflective, the membranes being separated by a cavity defined by a spacer part maintaining a distance between the membranes, the membranes thus providing a Fabry-Perot or air wedge interferometer. The sensor also includes a readout unit for sensing the variations in the distance between the membranes as is well known in the art.

The cavity between the membranes defines a first volume essentially sealed from the second volume outside the membranes. One of the volumes represents a reference volume and the other being a sensor volume being subject to pressure variations so that a pressure variation in one of said volumes results in a change in the distance between the membranes, the membranes moving in opposite directions.

Sealed in this context refers to an attenuation between the volumes of the frequencies in which the pressure variations is measured. Thus, acoustic low pass filtering such as low frequency leakage channels for pressure equalization between the volumes is understood as within the possible embodiments of the invention.

The cavity may be defined by said membranes have an opening on at least one side for receiving said pressure variations thus constituting the sensor volume, the propagation direction of the pressure variations thus being parallel with the membranes. This way the membranes moves synchronically in opposite directions as a response to the pressure waves or variations.

The cavity between the membranes may communicate with the pressure variations in the environment, thus constituting the sensor volume while the volume outside the membranes is enclosed in said reference volume, or alternatively may constitute at least a part of said reference volume while the volume outside the membranes constitute the sensor volume being subject to pressure variations.

In one embodiment the sensor and membranes are made from two symmetrical parts, each defining one membrane and a recess, said membranes and recesses defining a cavity between them. The symmetrical parts are machined from silicon discs, the membranes being produced from e.g. silicon nitride.

As mentioned above the pressure sensor may utilize two similar interferometers, a Fabry-Perot with two parallel membranes or air wedge with one membrane slightly tilted relative to the other, so as to provide an interference pattern in the light having interacted with both the membranes, and where at least part of the variations in the pattern resulting for the pressure variations is read by said readout unit.

In an embodiment where the membranes are produced on silicon wafers, and where the tilt is obtained by machining/etching a height difference in one end, depositing the membrane material and then etching the membrane free from the back side of the wafer, the strain in the membrane material stretches the membrane so that the membrane is provided with a skew angle relative to the original orientation of the surface.

Alternatively the if the membranes are produced on silicon wafers, and the tilt may be provided by pulling part of one of said membranes using electrostatic forces.

The spacer part maintaining the primary distance between the membranes may be used to adjust the distance and thus the optimal work point between the membranes so as to maintain the distance providing the maximum sensitivity.

The readout unit includes at least one light source transmitting light toward said membranes and at least one detector receiving light transmitted or reflected from said membranes, so as to measure changes in the received light depending on the variations in distances between the membranes. The readout unit may also include an optical element, e.g. a lens, for providing light slightly diverging or converging along the optical axis essentially perpendicular to at least one of said membranes so as to provide an interference pattern after having interacted with the two membranes, at least part of the interference pattern being read by at least one detector.

The membranes may be made on silicon wafers, e.g. depositing silicon nitride membranes, with one or more recesses being machined or etched into the wafers before depositing the membrane material, and wherein the recesses give shape to the produced form of free etched membranes, so that several different distances are obtained between the two membranes, being read optically. The recesses may be formed as half moon or rectangular, and are positioned in the central part of the membrane. Using two such silicon wafers with partially overlapping recesses it is possible to obtain three or four different distances, depending on if the depths of the recesses are equal or different as discussed above.

In order to optimize the quality of the interferometers the active parts of the membranes being used during the measurements should be sufficiently rigid to keep its shape when subject to the pressure variations. This may be obtained by producing grooves on the silicon wafer/disc with sharp angles in top and bottom around the recesses or active membrane parts providing distance differences between the membranes, and this way make the area around the recess more rigid to maintain the area with distance differences relatively flat. In order to increase the rigidity further the grooves may be filled with a suitable material.

Also, the silicon wafers/discs may be provided in which grooves are etched without sharp angles or edges, within the area chosen for producing a membrane, so that the membrane when deposited and etched free will stretch, reducing the strain in the membrane.

As is discussed above the pressure sensor described herein may also be used as a gas sensor where a gas is introduced in the sensor volume and is exposed to electromagnetic radiation by a pulsed radiation source with a chosen wavelength being characterized by being able to excite a specific gas to be detected. The resulting movements may be detected by the readout unit being adapted to detect pressure variations at the frequency of the pulsed radiation indicating the presence of the specific gas.

The gas sensor may include a semi permeable membrane used as an acoustic low pass filter letting the gas from the environment through to the sensor volume, with noise reduction in to the sensor, as well as reducing the leak of photoacoustic signal to the environment. A detection volume between the semipermeable membrane and pressure sensor may be made, and where this detection volume is provided with several windows, so as to utilize several different electromagnetic radiation sources on the same gas sample.

The detection volume may be made in the same silicon disc as the pressure sensor, but where the detection volume is coupled to the sensor volume through a channel, and wherein the walls in the detection volume transmits the chosen electromagnetic radiation used for analyzing the gas.

In order to reduce interference a gas sensor may be provided with a microphone and a loudspeaker outside the semipermeable membrane, and in which active noise reduction is used for generating anti-sound, so that the sound amplitude at the semipermeable membrane is reduced, primarily at the frequency or frequency range used for the photoacoustic gas detection.

Alternatively an acoustic notch filter is positioned outside the semipermeable membrane, and where the opening into the reservoir volume in the passive notch filter is covered by a gas tight membrane being thin and flexible enough not to affect the acoustic signal, and making sure that the gas does not diffuse into the resonator volume.

In addition the membrane may be heated so that the sensor may be used at low temperatures without altering the response of the acoustic filter.

The semi permeable membrane admits gas into the back volume so as to provide pressure equalization for static pressure and for frequencies lower that the detection frequency. In another embodiment the semi permeable membrane lets through as much pressure to the reference volume as to the volume between the membranes, so that external noise affects both sides the same amount and reduces the contribution from external noise, especially on the detection frequency.

In order to upconcentrate the gas within the measured volume an adsorption unit is integrated in the volume used for gas detection, and wherein air is pumped or sucked through the adsorption unit for a given time, whereafter the flow is stopped and the adsorbed gas is released, and whereby an analysis is performed on the released gas.

Two such gas sensors according to the invention may be used in parallel, but where one analyses the gas without gas flow while the other adsorbs the gas from the gas flow, and after a given time changing mode, the first adsorbing while the other analyzing.

The invention claimed is:

1. An optical pressure sensor using interferometric readout of pressure variations, the optical pressure sensor comprising:
    two membranes with essentially similar mechanical characteristics, wherein at least one of the membranes are partially transmitting and partially reflective, and where the second membrane is at least partially reflective, the membranes being separated by a cavity defined by a spacer part maintaining a distance between the membranes, the membranes providing a interferometer;
    a readout unit for sensing the variations in the distance between the membranes; and
    wherein the cavity defines a first volume between the membranes is essentially sealed from the second volume outside the membranes, one of them representing a reference volume and the other being a sensor volume being subject to pressure variations so that a pressure variation in one of the volumes results in a change in the distance between the membranes, the membranes moving in opposite directions.

2. The optical pressure sensor according to claim 1, wherein the cavity defined by the membranes have an opening on at least one side for receiving the pressure variations thus constituting the sensor volume, the propagation direction of the pressure variations thus being parallel with the membranes.

3. The optical pressure sensor according to claim 1, wherein the cavity between the membranes communicates with the pressure variations in the environment, thus constituting the sensor volume while the volume outside the membranes is enclosed in the reference volume.

4. The optical pressure sensor according to claim 1, wherein the cavity between the membranes constitutes at least a part of the reference volume while the volume outside the membranes constitute the sensor volume being subject to pressure variations.

5. The optical pressure sensor according to claim 1, the sensor and membranes being made from two symmetrical parts, each defining one membrane and a recess, the membranes and recesses defining a cavity between them.

6. The optical pressure sensor according to claim 5, wherein the symmetrical parts are machined from silicon discs, the membranes being produced from e.g. silicon nitride.

7. The optical pressure sensor according to claim 1, wherein one of the membranes are tilted relative to the other, so as to provide an interference pattern in the light having interacted with both the membranes, and where at least part of the variations in the pattern resulting for the pressure variations is read by the readout unit.

8. The optical pressure sensor according to claim 7, wherein the membranes are produced on silicon wafers, and where the tilt is obtained by machining/etching a height difference in one end, depositing the membrane material and then etching the membrane free from the back side of the wafer, whereby the strain in the membrane material stretches the membrane so that the membrane is provided with a skew angle relative to the original orientation of the surface.

9. The optical pressure sensor according to claim 7, wherein the membranes are produced on silicon wafers, and wherein the tilt is made by pulling part of one of the membranes using electrostatic forces.

10. The optical pressure sensor according to claim 1, wherein the membranes are parallel, so as to provide a Fabry-Perot interferometer, at least part of the variations in the pattern resulting from the pressure variations is read by the readout unit.

11. The optical pressure sensor according to claim 1, wherein the spacer part is adapted to adjust the distance between the membranes and thus the work point of the interferometer.

12. The optical pressure sensor according to claim 1, wherein the readout unit includes at least one light source transmitting light toward the membranes and at least one detector receiving light transmitted or reflected from the membranes, so as to measure changes in the received light depending on the variations in distances between the membranes.

13. The optical pressure sensor according to claim 1, wherein the readout unit includes an optical element, e.g. a lens, being used for providing light slightly diverging or converging along the optical axis essentially perpendicular to at least one of the membranes so as to provide an interference pattern after having interacted with the two membranes, at least part of the interference pattern being read by at least one detector.

14. The optical pressure sensor according to claim 1, wherein the membranes are produced on silicon wafers, including recesses being machined or etched into the wafer the recesses of the two membranes partially overlapping in the central part of the membranes, so as to obtain at least three different distances between the membranes being read optically.

15. The optical pressure sensor according to claim 1, wherein the membranes are made on silicon wafers, one or more recesses being machined or etched into the wafers before depositing the membrane material, and wherein the recesses give shape to the produced form of free etched membranes, so that several different distances are obtained between the two membranes, being read optically.

16. The optical pressure sensor according to claim 15, wherein the membranes include one or more grooves with sharp angles in top and bottom are used being positioned around the recesses adapted to provide height membrane distances, and this way stiffen the area around the recesses, making the recessed area relatively flat.

17. The optical pressure sensor according to claim 16, wherein the grooves are filled with a suitable material to increase the stiffness.

18. The optical pressure sensor according to claim 1, wherein the membranes are made on silicon wafers in which grooves are etched without sharp angles or edges within the area chosen for producing a membrane, so that the membrane when deposited and etched free will stretch, reducing the strain in the membrane.

19. The optical sensor according to claim 18, wherein an adsorption unit is integrated in the volume used for gas detection, and wherein air is pumped or sucked through the adsorption unit for a given time, where after the flow is stopped and the adsorbed gas is released, and whereby an analysis is performed on the released gas.

20. A gas sensor including a pressure sensor according to claim 1, wherein a gas is present in the sensor volume, the gas sensor including a pulsed or wavelength modulated radiation source with a chosen wavelength being able to excite a specific gas to be detected, readout unit being adapted to detect pressure variations at the frequency of the pulsed radiation indicating the presence of the specific gas.

21. The gas sensor according to claim 20, wherein a semi permeable membrane is used as an acoustic low pass filter letting the gas through, suppressing outside noise in to the sensor, as well as reducing the leak of photoacoustic signal to the environment.

22. The gas sensor according to claim 21, wherein the detection volume between the semipermeable membrane and pressure sensor is made, and where this detection volume is provided with several windows, so as to utilize several different electromagnetic radiation sources on the same gas sample.

23. The gas sensor according to claim 21, wherein the detection volume is made in the same silicon disc as the pressure sensor, but where the detection volume is coupled to the sensor volume through a channel, and wherein the walls in the detection volume transmits the chosen electromagnetic radiation used for analyzing the gas.

24. The gas sensor according to claim 21, including a microphone and a loudspeaker outside the semipermeable membrane, and in which active noise reduction is used for generating anti-sound, so that the sound amplitude at the semipermeable membrane is reduced, primarily at the frequency or frequency range used for the photoacoustic gas detection.

25. The gas sensor according to claim 21, in which an acoustic notch filter is positioned outside the semipermeable membrane, and where the opening into the reservoir volume in the passive notch filter is covered by a gas tight membrane being thin and flexible enough not to affect the acoustic signal, and making sure that the gas does not diffuse into the resonator volume.

26. The gas sensor according to claim 25, wherein the membrane is heated so that the sensor may be used at low temperatures without altering the response of the acoustic filter.

27. The gas sensor according to claim 21, wherein the semi permeable membrane admits gas into the reference volume so as to provide pressure equalization for static pressure and for frequencies lower that the detection frequency.

28. The gas sensor according to claim 27, wherein the semi permeable membrane lets through as much pressure to the back volume as to the volume between the membranes, so that external noise affects both sides the same amount and reduces the contribution from external noise, especially on the detection frequency.

29. The optical pressure sensor according to claim 1, where two such gas sensors are used in parallel, but where one analyses the gas without gas flow while the other adsorbs the gas from the gas flow, and after a given time changing mode, the first adsorbing while the other analyzing.

30. The optical pressure sensor according to claim 1, wherein an increase in pressure results in an essentially equal change in position for both membranes.

31. The optical pressure sensor according to claim 1, wherein a unit is used for active adjustment of the pressure in the sensor back volume so as to adjust the distance between the membranes and provide an optimal work point.

* * * * *